US012314528B2

(12) United States Patent
Jian et al.

(10) Patent No.: US 12,314,528 B2
(45) Date of Patent: May 27, 2025

(54) METHOD, APPARATUS, AND DEVICE FOR DISPLAYING A FEED FLOW, STORAGE MEDIUM AND PROGRAM

(71) Applicant: Beijing Zitiao Network Technology Co., Ltd., Beijing (CN)

(72) Inventors: Jingtong Jian, Beijing (CN); Jiayi Shi, Beijing (CN); Yuchen Wang, Beijing (CN); Cong Peng, Beijing (CN); Wenshu Zhang, Beijing (CN); Yao Guo, Beijing (CN); Junlin Cai, Beijing (CN); Chuanping Wang, Beijing (CN); Huang Qi, Beijing (CN); Xin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/796,320

(22) Filed: Aug. 7, 2024

(65) Prior Publication Data
US 2024/0393914 A1  Nov. 28, 2024

Related U.S. Application Data

(63) Continuation of application No. PCT/CN2023/080363, filed on Mar. 8, 2023.

(30) Foreign Application Priority Data

Mar. 11, 2022 (CN) .......................... 202210238710.2

(51) Int. Cl.
*G06F 3/04886* (2022.01)
*G06F 3/0481* (2022.01)
(Continued)

(52) U.S. Cl.
CPC .......... *G06F 3/0481* (2013.01); *G06F 3/0484* (2013.01); *G06F 3/04886* (2013.01); *G06F 3/04842* (2013.01)

(58) Field of Classification Search
None
See application file for complete search history.

(56) References Cited

U.S. PATENT DOCUMENTS 10,684,738 B1 * 6/2020 Sicora ................... G06F 3/0485
10,963,128 B1 * 3/2021 Paul ...................... G06F 3/0486
(Continued)

FOREIGN PATENT DOCUMENTS

| CN | 108769814 A | 11/2018 |
|---|---|---|
| CN | 110620949 A | 12/2019 |

(Continued)

OTHER PUBLICATIONS

International Patent Application No. PCT/CN2023/080363; Int'l Search Report; dated May 23, 2023; 3 pages.

(Continued)

*Primary Examiner* — Tuyetlien T Tran
(74) *Attorney, Agent, or Firm* — BakerHostetler

(57) ABSTRACT

Embodiments of the disclosure provide a method, an apparatus, and a device for displaying a feed flow, storage medium, and a program. The method includes: presenting a feed flow interface; in response to detecting a predetermined swipe operation input by a user in the feed flow interface, determining a target feed flow element to be displayed from a plurality of feed flow elements included in the feed flow; in response to a type of the target feed flow element being an interactive type, displaying an interaction process of an interactive content recommended by the target feed flow element in the feed flow interface; wherein the interaction process is formed based on an interactive material of the (Continued)

interactive content and an interaction operation input by the user for the interactive material, the interaction process indicating an interaction process of using the interactive content.

20 Claims, 8 Drawing Sheets

(51) Int. Cl.
    *G06F 3/0484*      (2022.01)
    *G06F 3/04842*      (2022.01)

(56) References Cited

U.S. PATENT DOCUMENTS

| | | | |
|---|---|---|---|
| 10,970,884 B1 * | 4/2021 | Yang | G06T 11/001 |
| 11,216,172 B1 * | 1/2022 | Hart | G06F 3/0482 |
| 11,252,118 B1 * | 2/2022 | Paul | H04L 51/214 |
| 2014/0026048 A1 | 1/2014 | Spirer | |
| 2014/0026408 A1 | 1/2014 | Spirer | |
| 2014/0087883 A1 * | 3/2014 | Lee | A63F 13/47 463/42 |
| 2016/0162953 A1 * | 6/2016 | Tang | G06Q 30/0269 705/14.66 |
| 2019/0200051 A1 * | 6/2019 | Paul | H04N 21/4788 |
| 2019/0356710 A1 * | 11/2019 | Zeng | G06F 3/04847 |
| 2020/0228880 A1 * | 7/2020 | Iyer | H04N 21/251 |
| 2020/0336804 A1 * | 10/2020 | Cui | H04N 21/4781 |
| 2020/0366963 A1 * | 11/2020 | Liao | H04N 21/4312 |
| 2021/0405828 A1 * | 12/2021 | Jiang | G06Q 30/0633 |
| 2022/0072436 A1 * | 3/2022 | Tang | A63F 13/48 |
| 2022/0236844 A1 * | 7/2022 | Luo | G06F 9/451 |
| 2022/0239985 A1 * | 7/2022 | Kou | G06F 3/0482 |
| 2023/0004268 A1 * | 1/2023 | Jiao | G06F 3/04883 |

FOREIGN PATENT DOCUMENTS

| | | |
|---|---|---|
| CN | 111580913 A | 8/2020 |
| CN | 111580914 A | 8/2020 |
| CN | 112004134 A | 11/2020 |
| CN | 111966275 B | 7/2021 |
| CN | 113190316 A | 7/2021 |
| CN | 114579030 A | 6/2022 |
| CN | 111580718 A | 1/2023 |
| JP | 2014-522527 A | 9/2014 |

OTHER PUBLICATIONS

China Patent Application No. 2022102387102.2; Office Action; dated Jul. 7, 2023; 12 pages.
European Patent Application No. 23766061.8; Extended European Search Report dated Mar. 19, 2025, 9 pages.
Japanese Patent Application No. 2024-545857; Office Action mailed Mar. 4, 2024, 8 pages with machine translation.

* cited by examiner

METHOD, APPARATUS, AND DEVICE FOR DISPLAYING A FEED FLOW, STORAGE MEDIUM AND PROGRAM

CROSS REFERENCE

This application is a continuation of International Application No. PCT/CN2023/080363, filed on Mar. 8, 2023, which claims priority to Chinese Patent Application No. CN202210238710.2, filed on Mar. 11, 2022. The entire contents of these applications are hereby incorporated by reference in their entireties.

FIELD

Embodiments of the present disclosure relate to the field of human-computer interaction technologies, and in particular, to a method, an apparatus, and a device for displaying a feed flow, storage medium, and a program.

BACKGROUND

Feed flow is a data format that continuously provides contents to a user. The feed flow includes a set of contents, such as, a set of videos, a set of graphic and text information, etc. Taking a feed flow including a set of videos as an example, a terminal device displays one of the videos in a feed flow interface. During the display of this video, the user may input a predetermined swipe sliding instruction to trigger the terminal device to display the next video in the feed flow.

In some scenarios, the terminal device may recommend some contents in the feed flow to the user such as recommending applications, recommending mini-games on web pages, and so on. In the example of recommending an application program A, a recommendation video of application A may be inserted into the feed flow. As the user browses the feed flow, when the terminal device displays the recommendation video for application A, a "View Details" control may be displayed in the feed flow interface. When the user clicks on the control, the terminal device jumps to display a detail landing page corresponding to application A, where more detailed information about application A and a download control for application A are presented. The user may determine whether to download application A based on the detailed information presented in the detail landing page.

However, it has been found in practice that the probability of the user clicking on the "View Details" control when browsing the feed flow is relatively low, resulting in a poor effect of content recommendation.

SUMMARY

Embodiments of the present disclosure provide a method, an apparatus, and a device for displaying a feed flow, storage medium, and a program, to improve the content recommendation effect.

In a first aspect, the present disclosure provides a method for displaying a feed flow, comprising:
  presenting a feed flow interface;
  in response to detecting a predetermined swipe operation input by a user in the feed flow interface, determining a target feed flow element to be displayed from a plurality of feed flow elements comprised in the feed flow;
  in response to a type of the target feed flow element being an interactive type, displaying an interaction process of an interactive content recommended by the target feed flow element in the feed flow interface;
  wherein the interaction process is formed based on an interactive material of the interactive content and an interaction operation input by the user for the interactive material, the interaction process indicating an interaction process of using the interactive content.

In a second aspect, the present disclosure provides an apparatus for displaying a feed flow, comprising:
  a first display module configured to present a feed flow interface;
  a determination module configured to in response to detecting a predetermined swipe operation input by a user in the feed flow interface, determine a target feed flow element to be displayed from a plurality of feed flow elements comprised in the feed flow;
  a second display module configured to in response to a type of the target feed flow element being an interactive type, display an interaction process of an interactive content recommended by the target feed flow element in the feed flow interface;
  wherein the interaction process is formed based on an interactive material of the interactive content and an interaction operation input by the user for the interactive material, the interaction process indicating an interaction process of using the interactive content.

In a third aspect, the present disclosure provides an electronic device, comprising: a processor and a memory;
  wherein the memory stores computer executable instructions;
  the processor executes the computer executable instructions to carry out the method as described in the first aspect.

In a fourth aspect, the present disclosure provides a computer-readable storage medium having computer executable instructions stored thereon, wherein the computer executable instructions, when executed by a processor, carry out the method as described in the first aspect.

In a fifth aspect, the present disclosure provides a computer program product comprising a computer program, wherein the computer program, when executed by a processor, carry out the method as described in the first aspect.

The present disclosure provides a method, device, equipment, storage medium, and program for displaying an information stream. The method includes: presenting a feed flow interface; in response to detecting a predetermined swipe operation input by a user in the feed flow interface, determining a target feed flow element to be displayed from a plurality of feed flow elements comprised in the feed flow; in response to a type of the target feed flow element being an interactive type, displaying an interaction process of an interactive content recommended by the target feed flow element in the feed flow interface; wherein the interaction process is formed based on an interactive material of the interactive content and an interaction operation input by the user for the interactive material, the interaction process indicating an interaction process of using the interactive content. Through the above process, during the user is browsing the feed flow, it is not necessary to jump to a landing page. The user can directly try to play/try out the interactive content in the feed flow interface, thereby deepening the user's understanding of the interactive content through the try to play/trying out, and thus improving the content recommendation effect.

BRIEF DESCRIPTION OF THE DRAWINGS

To clearly illustrate the embodiments of the present disclosure or the technical solutions in the prior art, the accompanying drawings used in the description of the embodiments or the prior art will be briefly described below. It is apparent that the accompanying drawings in the following description are some of the embodiments of the present disclosure, and for those skilled in the art, other accompanying drawings can be acquired based on these accompanying drawings without creative efforts.

DETAILED DESCRIPTION

To make the objectives, technical solutions, and advantages of the embodiments of the present disclosure clearer, in the following, the technical solutions in embodiments of the present disclosure will be described clearly and completely in connection with the accompanying drawings in the embodiments of the present disclosure. It is apparent that the described embodiments are part of the embodiments of the present disclosure, but not all of them. Based on the embodiments of the present disclosure, all other embodiments acquired by those skilled in the art without creative efforts should fall within the scope of protection of the present disclosure.

The technical solutions provided by the embodiments of the present disclosure may be applied to scenarios where a terminal device display a feed flow. The terminal device may be any electronic device with a feed flow display function, including but not limited to: mobile phones, laptops, tablets, smart in-car devices, smart wearable devices, smart screens, etc.

To facilitate understanding, the terms involved in the embodiments of the present disclosure are explained.

The feed flow, also known as a feed stream, is a data format that continuously provides contents to a user. The feed flow includes a set of information/contents, such as, a set of videos, a set of graphic and text information, etc.

A feed flow element refers to each piece of information/content in the feed flow. For example, in an example of a video feed flow, each video therein is a feed flow element.

A feed flow interface refers to an interface in the terminal device for displaying the feed flow.

Figure 1:
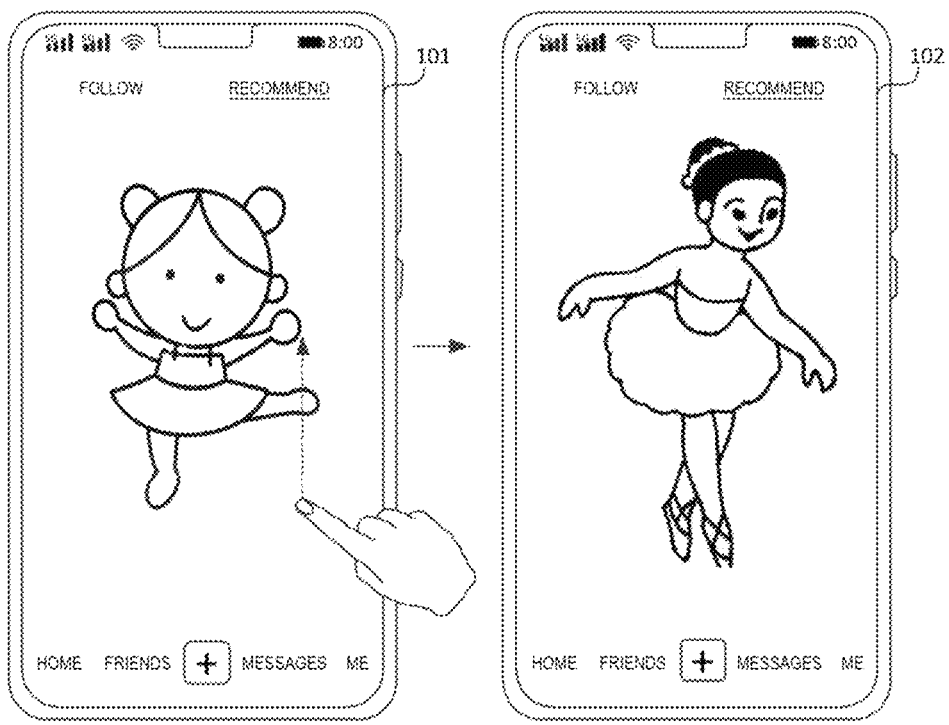
FIG. 1 is a schematic diagram of a feed flow display scenario provided by the embodiments of the present disclosure.

FIG. 1 is a schematic diagram of a feed flow display scenario provided by the embodiments of the present disclosure. An example is illustrated with a feed flow that includes a set of videos (for example, video A, video B, video C, . . . , etc.). As shown in FIG. 1, an interface 101 and an interface 102 are both feed flow interfaces. The video A in the feed flow is displayed in the interface 101. When the user wants to watch the next video in the feed flow, a predetermined swipe operation (for example, a swipe-up operation) may be input in the interface 101. The terminal device displays the video B in the feed flow in response to the predetermined swipe operation, as shown in the interface 102. It should be understood that the interface 101 and interface 102 illustrate only a certain image frame of the video.

Figure 2:
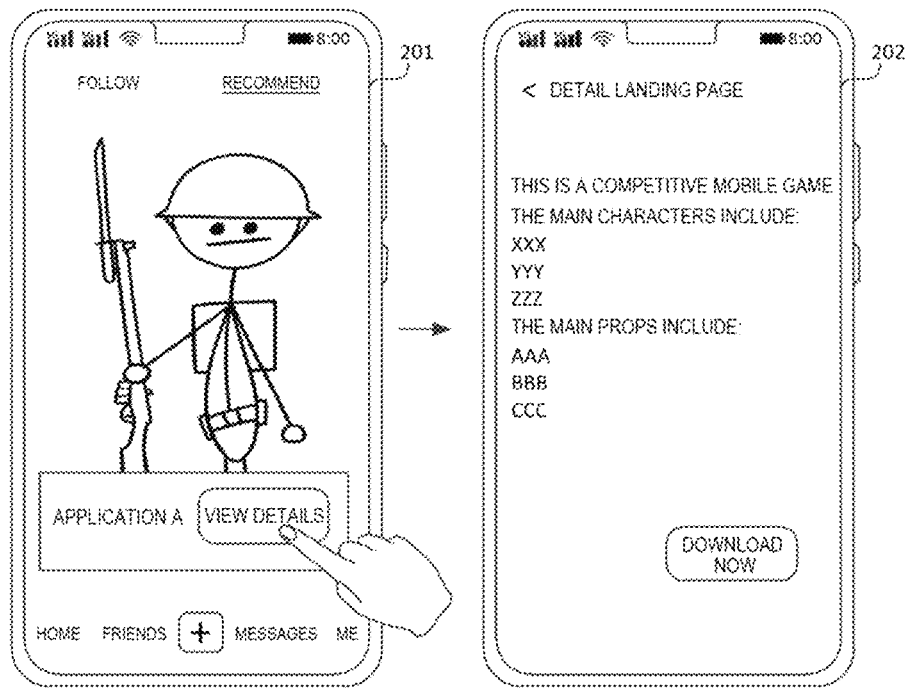
FIG. 2 is a schematic diagram of an interface for recommending an application in a feed flow according to related technology.

In some scenarios, the terminal device may recommend some information in the feed flow to the user, such as, recommending an application program, recommending mini-games on web pages, and so on. FIG. 2 is a schematic diagram of an interface for recommending an application program in a feed flow in the related art. As shown in FIG. 2, in the example of recommending an application program A, a recommendation video of application A may be inserted into the feed flow, and the recommendation video is used to introduce related information of application A. For example, assuming that application A is a game program, the recommendation video of application A may include one or more game screens. In a process of the user browsing a feed flow, when displaying the recommendation video of application A, the terminal device may display a "View Details" control in the feed flow interface, as shown in the interface 201. When the user clicks on the control, the terminal device jumps to display a detail landing page corresponding to application A, in which more detailed information about application A and a download control for application A are presented, as shown in the interface 202.

In the related art as described above, if the user is interested in the application program recommended by the feed flow element, the user may click the "View Details" control in the feed flow interface, so that the terminal device jumps to the detail landing page. The user may determine whether to download the application A based on the detailed information shown in the detail landing page. However, in practice, it has been found that the probability of the user clicking on the "View Details" control when browsing the feed flow is relatively low, resulting in a poor effect of application recommendation. In addition, for a content recommendation party, it is necessary to produce not only the recommendation video of application A but also the detail landing page of application A. It is also necessary to consider the association between the contents of the two, so that the cost for content production is relatively high.

In order to solve the above technical problems, the present disclosure provides a method, an apparatus, a device, a storage medium and a program for displaying a feed flow. For feed flow elements of an interactive type, the interaction process of the interactive content to be recommended may be directly displayed in the feed flow interface. The interaction process is based on the interactive material of the interactive content and the interaction operation input by the user for the interactive material, and the interaction process indicates an interaction process of use of the interactive content. In other words, displaying the interaction process of the interactive content in the feed flow interface is actually displaying the user's try-to-play/trying out process of the interactive content.

In the technical solutions provided in the present disclosure, in the process of the user browsing the feed flow, it is not necessary to jump to the landing page, and the user may directly try to play/try out the interactive content in the feed flow interface, which deepens the user's understanding of the interactive content, and thus improves the content recommendation effect. In addition, by means of try-to-play/trying out, the user can understand the interactive content more deeply, thereby improving the recommendation effect of the interactive content. In addition, with regard to a content recommendation party, it only needs to produce interactive materials for realizing the described interaction process, which reduces the cost of content production.

The technical solutions provided by the present disclosure will be described in detail below in connection with several specific embodiments. Several embodiments may be combined with each other, and the same or similar concepts or processes may not be repeated in some embodiments.

Figure 3:
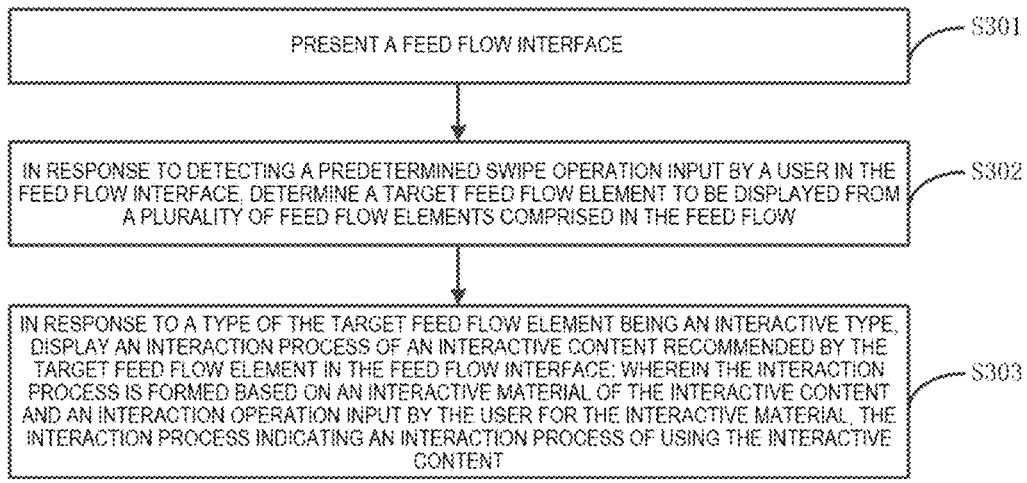
FIG. 3 is a flowchart of a method for displaying a feed flow provided by the embodiments of the present disclosure.

FIG. 3 is a flowchart of a method for displaying a feed flow provided by the embodiments of the present disclosure. The method of the embodiments may be performed by a terminal device. For example, a feed flow recommendation application may be installed on the terminal device, and the method of the embodiments may be executed by the feed flow recommendation application.

As shown in FIG. 3, the method of the embodiments includes:

S301: presenting a feed flow interface.

The feed flow interface is an interface for displaying the feed flow. The feed flow includes a plurality of feed flow elements. The feed flow interface may display one of feed flow elements in the feed flow. For example, in the example shown in FIG. 1, both interface 101 and interface 102 may be referred to as feed flow interfaces.

S302: in response to detecting a predetermined swipe operation input by a user in the feed flow interface, determining a target feed flow element to be displayed from a plurality of feed flow elements comprised in the feed flow.

The user inputs a predetermined swipe operation in the feed flow interface to switch the currently displayed feed flow element to another feed flow element in the feed flow. The predetermined swipe operation may include but is not limited to one of the following: a swipe-up operation, a swipe-down operation, a swipe-left operation, a swipe-right operation, etc.

In the example of swipe-up and swipe-down operations, assuming that the currently displayed feed flow element is the x-th feed flow element in the feed flow. If the user is detected to input a swipe-up operation in the feed flow interface, the (x+1)-th feed flow element in the feed flow is determined as the target feed flow element. If the user is detected to input a swipe-down operation in the feed flow interface, the (x−1)-th feed flow element in the feed flow is determined as the target feed flow element. For example, assuming that the feed flow includes: Video A, Video B, Video C, . . . , etc., Video B is currently displayed in the feed flow interface. When the swipe-up operation input by the user in the feed flow interface is detected, it means that the target feed flow element to be displayed is Video C. When the swipe-down operation input by the user in the feed flow interface is detected, the target feed flow element to be displayed is Video A.

After determining the target feed flow element, the type of the target feed flow element can also be determined. In this embodiment, the feed flow elements can be divided into two or more types, one of which is an interactive type. If a feed flow element is of the interactive type, it means that the feed flow element is used to recommend certain content to the user interactively.

For example, the feed flow elements can be divided into two types: Type 1 is a video type, and Type 2 is an interactive type. Thus, among the multiple feed flow elements included in the feed flow, some may be of the video type, and others may be of the interactive type.

S303: If the type of the target feed flow element is the interactive type, displaying an interaction process of an interactive content recommended by the target feed flow element in the feed flow interface; wherein the interaction process is formed based on an interactive material of the interactive content and an interaction operation input by the user for the interactive material, the interaction process indicating an interaction process of using the interactive content.

The content recommended by the target feed flow element may be referred to as the interactive content. The interactive content may be an application (APP) or a Web program. The web program, also known as a webpage program, refers to a program that can be embedded in a web page, such as a page game. The interactive material refers to various visual objects that participate in the human-computer interaction operations during the interaction process. Interactive material may usually change position and/or display effects based on human-computer interaction operations. The embodiments do not limit the types of interactive materials, which may include graphics and text information, animations, videos, audio, and so on.

The interaction operations input by the user for the interactive material include but are not limited to: a click operation, a swipe operation, a drag operation, a press operation, and so on.

The interaction process of using the interactive content refers to the interaction between the user and the interactive content during the actual use of the interactive content by the user. For example, in a case where the interactive content is an application, the interaction process indicates the interaction process involved in the user's use of the application; in a case where the interactive content is a webpage program, the interaction process indicates the interaction process involved in the user's use of the webpage program.

In this embodiment, in a case where the type of the target feed flow element is the interactive type, the content recommended by the target feed flow element is referred to as the interactive content, and the interaction process of the interactive content is directly displayed in the feed flow interface. The interaction process is formed based on the interactive material of the interactive content and the interaction operation input by the user for the interactive material. For example, the interactive material of the interactive content may be displayed in the feed flow interface, and the user inputs the interaction operations for the interactive material, so that the interactive material changes with the interaction operations, thereby forming the interaction process as described above. In other words, the above interaction process presents a process of the interactive material changing with the interaction operations.

In the above-described interaction process, the interactive material displayed in the feed flow interface corresponds to a page content seen by the user when actually using the interactive content. The interaction operations input by the user for the interactive material correspond to the operations that the user needs to input when actually using the interactive content. It can be seen that the interaction process reflects the user's try-to-play/trying out process of the interactive content, or in other words, the above-described interaction process reflects the interaction process of using the interactive content.

The method for displaying a feed flow provided by the embodiments includes: presenting a feed flow interface; in response to detecting a predetermined swipe operation input by a user in the feed flow interface, determining a target feed flow element to be displayed from a plurality of feed flow elements comprised in the feed flow; in response to a type of the target feed flow element being an interactive type, displaying an interaction process of an interactive content recommended by the target feed flow element in the feed flow interface; wherein the interaction process is formed based on an interactive material of the interactive content and an interaction operation input by the user for the interactive material, the interaction process indicating an interaction process of using the interactive content. Through the above process, during the user is browsing the feed flow, it is not necessary to jump to a landing page. The user can directly try to play/try out the interactive content in the feed flow interface, thereby deepening the user's understanding of the interactive content through the try-to-play/trying out, and thus improving the content recommendation effect.

Based on the embodiments shown in FIG. 3, the technical solution of the present disclosure is described in more detail below in connection with a specific embodiment.

Figure 4:
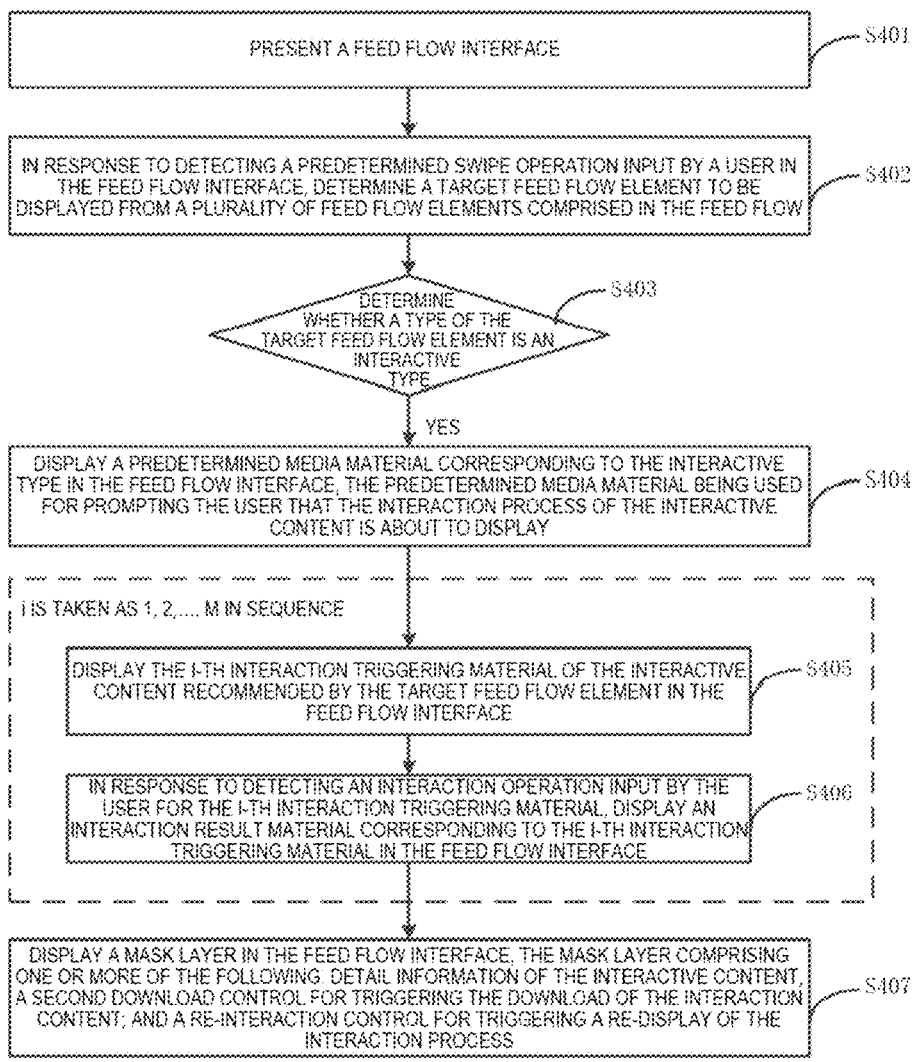
FIG. 4 is a flowchart of another method for displaying a feed flow provided by the embodiments of the present disclosure.

FIG. 4 is a flowchart of another method for displaying a feed flow provided by the embodiments of the present disclosure. As shown in FIG. 4, the method of this embodiment includes:

S401: presenting a feed flow interface.

S402: in response to detecting a predetermined swipe operation input by a user in the feed flow interface, determining a target feed flow element to be displayed from a plurality of feed flow elements comprised in the feed flow.

S403: determining whether a type of the target feed flow element is an interactive type.

It should be understood that the implementations of S401 to S403 may refer to the related descriptions of the embodiments shown in FIG. 3, and will not be repeated herein.

If the type of the target feed flow element is the interactive type, S404 to S407 as described below are performed.

S404: displaying a predetermined media material corresponding to the interactive type in the feed flow interface, the predetermined media material being used for prompting the user that the interaction process of the interactive content is about to display.

The predetermined media material may be in the form of video, animation, graphics and text information, and so on, and this embodiment does not limit in this regard. The predetermined media material prompts the user next to enter the interaction process of the interactive content. It should be understood that for each feed flow element of the interactive type in the feed flow, a uniform predetermined media material is presented before the interaction process is displayed in the feed flow interface. As such, the predetermined media material serves as an identifier of feed flow elements of the interactive type, which reinforces the user's awareness.

It should be understood that the above S404 is an optional step.

In this embodiment, the number of interactive materials of the interactive content may be one or more. For example, the interactive materials of the interactive content may include M interaction triggering materials and corresponding interaction result materials for each interaction triggering material. M is an integer greater than or equal to 1. Thus, S405 and S406 are performed for each interaction triggering material, respectively; so that the interaction process of the interactive content presents in the feed flow interface. In the following S405 and S406, i is taken as 1, 2, . . . , M in sequence. M is an integer greater than or equal to 1.

S405: displaying the i-th interaction triggering material of the interactive content recommended by the target feed flow element in the feed flow interface.

S406: in response to detecting an interaction operation input by the user for the i-th interaction triggering material, displaying an interaction result material corresponding to the i-th interaction triggering material in the feed flow interface.

In this embodiment, each interaction triggering material corresponds to an interaction result material. In a case that an interaction triggering material is displayed in the feed flow interface, the user inputs an interaction operation for the interaction triggering material, which may trigger the display of an interaction result material corresponding to the interaction triggering material in the feed flow interface. As a result, a process of the interactive material changing with the interaction operation is presented in the feed flow interface, that is, the interaction process of the interactive content is formed.

In some possible implementations, each interaction triggering material includes at least one interactive hot zone. The interactive hot zone refers to an area within the interaction triggering material that is available for the user to input an interaction operation. In the above S405, the i-th interaction triggering material may be displayed in the feed flow interface, and a guidance identifier may be displayed in each interactive hot zone of the i-th interaction triggering material. The guidance identifier is used to guide the user to input an interaction operation in the interactive hot zone.

The guidance identifier may be implemented in various ways, and the embodiments do not limit in this regard, as long as it can guide the user to input the interaction operation. For example, the guidance identifier may be one of the following: a gesture click, a mouse click, an interactive hot zone shaking, and so on.

Accordingly, in the above S406, in response to detecting an interaction operation inputted by the user for a target interactive hot zone in the i-th interaction triggering material, displaying an interaction result material corresponding to the target interactive hot zone of the i-th interaction triggering material in the feed flow interface. The target interactive hot zone is any of the at least one interactive hot zone.

In some examples, the i-th interaction triggering material may include one interactive hot zone. When the i-th interaction triggering material is displayed in the feed flow interface, a guidance identifier is displayed in the interactive hot zone. The user may input an interaction operation for the interactive hot zone according to the guidance identifier. In this case, the i-th interaction triggering material corresponds to one interaction result material. When the user inputs an interaction operation for the interactive hot zone, the interaction result material is displayed in the feed flow interface.

In other examples, the i-th interaction triggering material may include a plurality of interactive hot zones. When the i-th interaction triggering material is displayed in the feed flow interface, a guidance identifier may be displayed in each interactive hot zone. Based on these guidance identifiers, the user may input an interaction operation for one of the interactive hot zones. In this case, the interaction result materials corresponding to the i-th interaction triggering material may be multiple. For example, each interactive hot zone corresponds to one interaction result material. When an interaction operation input by the user for a certain interactive hot zone is detected, an interaction result material corresponding to that interactive hot zone is displayed in the feed flow interface.

For case of understanding, the process of displaying the feed flow will be illustrated below in connection with FIGS. 5A to 5D.

Figure 5A:
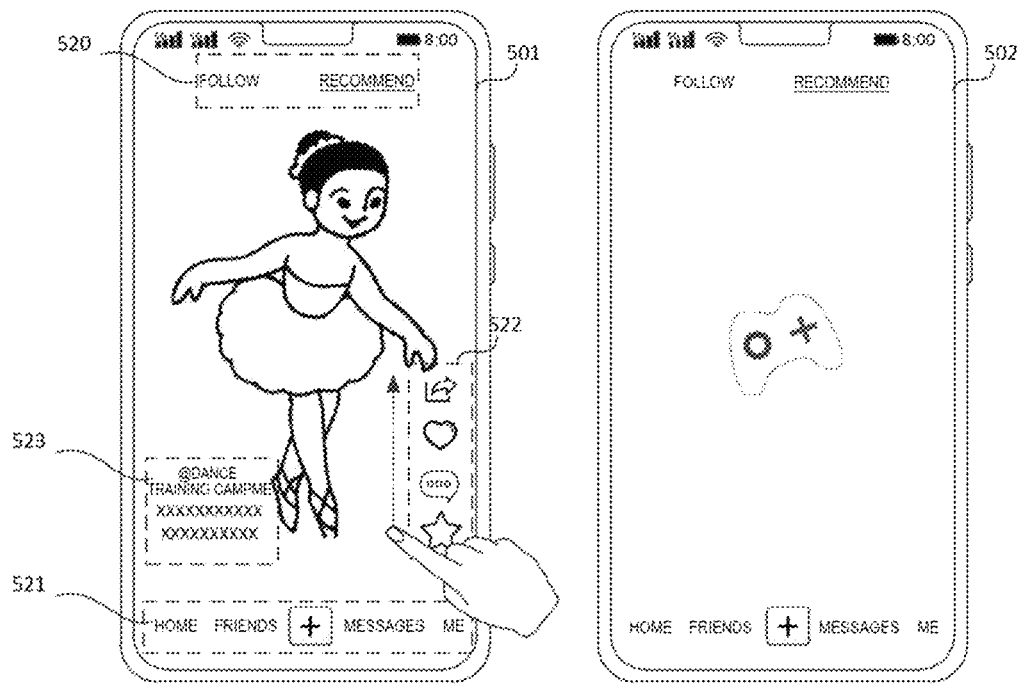
FIG. 5A is a schematic diagram of a set of feed flow display interfaces provided by the embodiments of the present disclosure.

FIG. 5A is a schematic diagram of a set of feed flow display interfaces provided by the embodiments of the present disclosure. As shown in FIG. 5A, it is assumed that the feed flow interface is currently displaying a certain video in the feed flow, as shown in Interface 501. After the user inputs a predetermined swipe operation (e.g., a swipe-up operation) in the interface 501, the terminal device determines the next feed flow element in the feed flow as the target feed flow element. Assuming that the type of the target feed flow element is the interactive type, the terminal device displays a predetermined media material in the feed flow interface for prompting the user to enter the interaction process of the interactive content in the next. By way of example, the predetermined media material may be an animation, and the interface 502 illustrates an image frame of the predetermined media material.

It is assumed that the interactive content recommended by the target feed flow element is a game X. After the display of the predetermined media material in FIG. 5A is finished, the terminal device displays the interaction process of Game X in the feed flow interface. For example, assuming that the interactive materials of Game X include three interaction triggering materials and the corresponding interaction result material for each interaction triggering material, each of the interaction triggering materials may be displayed in the feed flow interface in turn, and based on the user's interaction operation for the interaction triggering material, a corresponding interaction result material is displayed, thereby forming the interaction process as described above. An example of the interaction process is illustrated below in connection with FIGS. 5B to 5D.

Figure 5B:
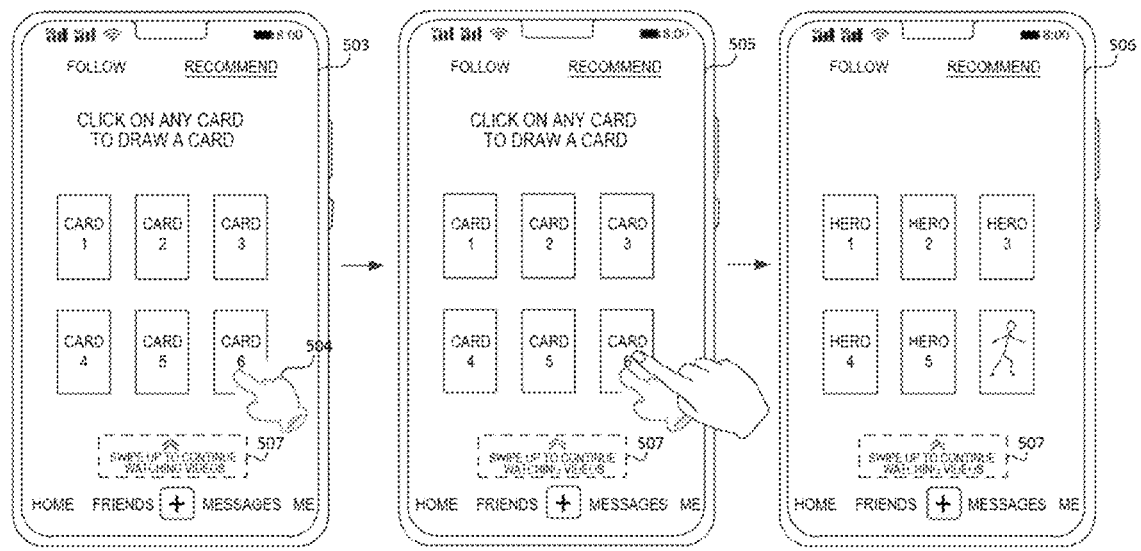
FIG. 5B is a schematic diagram of another set of feed flow display interfaces provided by the embodiments of the present disclosure.

FIG. 5B is a schematic diagram of another set of feed flow display interfaces provided by the embodiments of the present disclosure. FIG. 5B illustrates the first interaction triggering material of Game X and the interaction process formed by the interaction operation input by the user for the first interaction triggering material. Refer to the interface 503, where the first interaction triggering material is displayed in the feed flow interface, and a guidance identifier is displayed in the interactive hot zone of the first interaction triggering material. Taking a scene of "Select Hero" in Game X as an example, a plurality of cards is displayed in the interface 503, and each card corresponds to a hero. In addition, in the interface 503, a gesture 504 servers as a guidance identifier to guide the user to click on one of the cards. It should be understood that the interface 503 illustrates an image frame in the first interaction triggering material.

The user may perform a click operation against a card based on the guidance identifier (i.e., the gesture 504). Referring to the interface 505, it is assumed that the user inputs the click operation against a Card 6. After the terminal device detects the click operation input by the user for the Card 6, the interaction result material corresponding to the first interaction triggering material is displayed in the feed flow interface, as shown in the interface 506. For example, in the interaction result material, each card may be flipped to present a hero identifier corresponding to each card, and display a hero image corresponding to the card selected by the user. It should be understood that the interface 506 illustrates an image frame in the interaction result material.

Figure 5C:
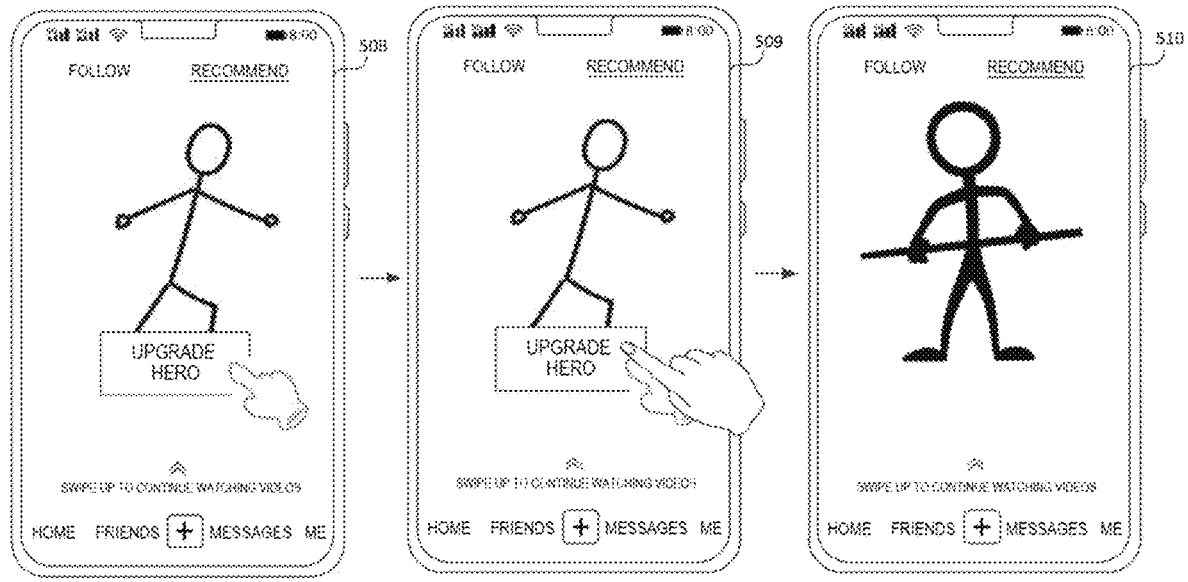
FIG. 5C is a schematic diagram of yet another set of feed flow display interfaces provided by the embodiments of the present disclosure.

FIG. 5C is a schematic diagram of yet another set of feed flow display interfaces provided by the embodiments of the present disclosure. FIG. 5C illustrates the second interaction triggering material of Game X and the interaction process formed by the interaction operation input by the user for the second interaction triggering material. Refer to the interface 508, where the second interaction triggering material is displayed in the feed flow interface, and a guidance identifier is displayed in the interactive hot zone of the second interaction triggering material. Taking a scene of "Upgrade Hero" in Game X as an example, the hero image selected by the user and a "Upgrade Hero" control are displayed in the interface 508. In addition, in the interface 508, the gesture serves as a guidance identifier to guide the user to click on the "Upgrade Hero" control. It should be understood that the interface 508 illustrates an image frame in the second interaction triggering material.

Refer to the interface 509, where the user may click on the "Upgrade Hero" control according to the guidance identifier. After the terminal device detects the click operation input by the user for the "Upgrade Hero" control, the interaction result material corresponding to the second interaction triggering material is displayed in the feed flow interface, as shown in the interface 510. For example, an image of the upgraded hero may be present in the interaction result material. It should be understood that the interface 510 illustrates an image frame of the interaction result material.

Figure 5D:
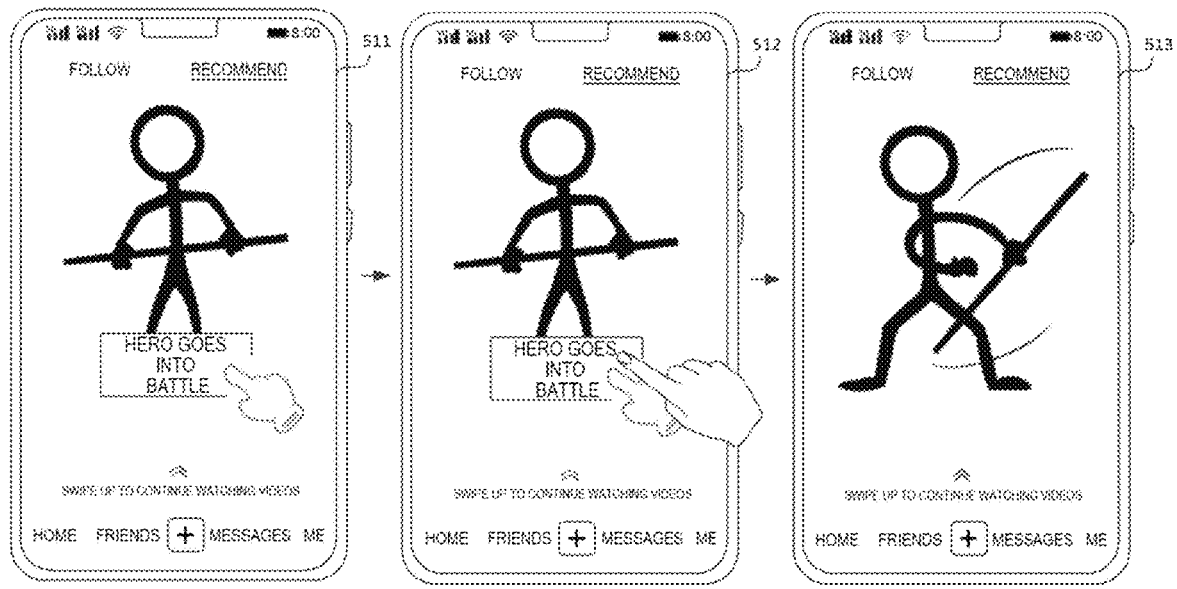
FIG. 5D is a schematic diagram of yet another set of feed flow display interfaces provided by the embodiments of the present disclosure.

FIG. 5D is a schematic diagram of yet another set of feed flow display interfaces provided by the embodiments of the present disclosure. FIG. 5D illustrates the third interaction triggering material of Game X and the interaction process formed by the interaction operation input by the user for the third interaction triggering material. Refer to interface 511, where the third interaction triggering material is displayed in the feed flow interface, and a guidance identifier is displayed in the interactive hot zones of the third interaction triggering material. Taking a scene of "Hero Goes into Battle" in Game X as an example, the image of the hero upgraded by the user and the "Hero Goes into Battle" control are displayed in the interface 511. In the interface 511, the gesture serves as a guidance identifier to guide the user to click on the "Hero Goes into Battle" control. It should be understood that the interface 511 illustrates an image frame of the third interaction triggering material.

Refer to the interface 512, where the user may click on the "Hero Goes into Battle" control according to the guidance identifier. After the terminal device detects the click operation input by the user for the "Hero Goes into Battle" control, the interaction result material corresponding to the third interaction triggering material is displayed in the feed flow interface, as shown in the interface 513. For example, a scene where the upgraded hero is fighting may be presented in the interaction result material. It should be understood that the interface 513 illustrates an image frame of the interaction result material.

In some possible implementations, during the terminal device is presenting the interaction process of Game X in the feed flow interface, a switching prompt component may be displayed in the feed flow interface for prompting the user that he or she can input a predetermined swipe operation to switch to display other feed flow elements at any time during the interaction process. For example, referring to FIG. 5A, in the interfaces 503, 504, and 506, a component 507 (e.g., "Swipe up to continue watching a video") is displayed in the feed flow interface. Thus, if the user is not interested in the interaction process of Game X, he or she may input the swipe-up operation at any time to switch to display subsequent feed flow elements.

In some possible implementations, after the interaction result material corresponding to the i-th interaction triggering material is displayed in the feed flow interface, a transition material between the i-th interaction triggering material and the (i+1)-th interaction triggering material may further be displayed in the feed flow interface. The transition material is used to connect the interaction result material corresponding to the i-th interaction triggering material and the (i+1)-th interaction triggering material, so as to provide better connectivity between pictures and contents of the entire interaction process.

Continuing to refer to FIG. 5, assuming that the feed flow interface is currently displaying the first feed flow element, and the type of the first feed flow element is a video type, a presentation effect of the feed flow interface is as shown in the interface 501. The feed flow interface includes: a first type of interface component located at a boundary of the feed flow interface, such as the interface component 520 at the top of the feed flow interface (e.g., the follow component, the recommend component, and so on), and the interface component 521 at the bottom of the feed flow interface (e.g., home, friends, +, messages, me, and so on). Moreover, the feed flow interface further includes a second type of interface component located above a display picture of the feed flow interface, such as the interface component 523 on the left region of the display picture (e.g., a text description component), and the interface component 524 on the right region of the display picture (e.g., a share component, a like component, a comment component, a favorite component, and so on).

When the user inputs a predetermined swipe operation in the feed flow interface, the feed flow interface switches to display the interaction process of the interactive content. As shown in the interfaces 502, 503, 505, 506, 508, 509, 510, 511, 512, and 513 in FIG. 5. When the feed flow interface is displaying the interaction process, the first type of interface component is presented at the boundary of the feed flow interface, i.e., the interface component 520 is presented at the top of the feed flow interface and the interface component 521 is presented at the bottom. Additionally, the second type of interface component is not displayed on the display picture of the feed flow interface, i.e., the interface component 523 is not presented in the left region and the interface component 524 is not presented in the right region. As such, the interaction process can be displayed in full screen in the feed flow interface. It should be understood that "full screen" herein contains two meanings, the first meaning is that the display screen of the interaction process occupies the entire display area of the feed flow interface, and the second meaning is that no interface components are overlaid on the display screen of the feed flow interface.

By displaying the interaction process in full screen in the feed flow interface, the user can perceive that he or she is interacting within the feed flow while browsing the feed flow, thus allowing the user to be fully immersed in the interaction process and enhancing the interactive effect.

Figure 6:
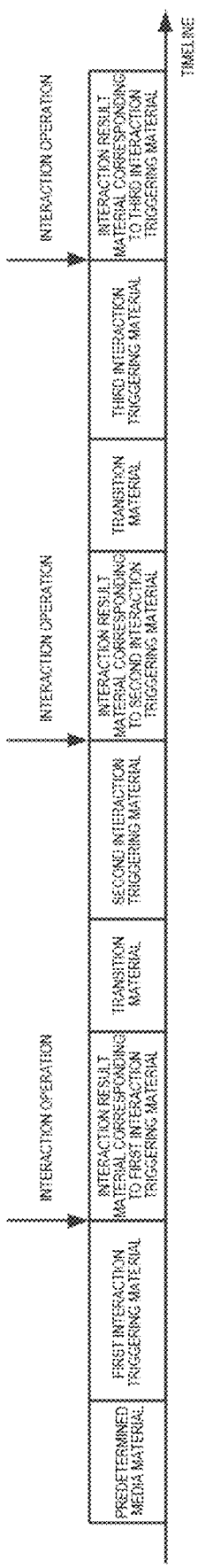
FIG. 6 is a schematic diagram of a display timing of interactive materials provided by the embodiments of the present disclosure.

As an example, FIG. 6 is a schematic diagram of a display timing of interactive materials provided by the embodiments of the present disclosure. Taking three interaction triggering materials as an example, as shown in FIG. 6, the display sequence of various materials is as follows:

(1) displaying the predetermined media material. Refer to interface 502.
(2) displaying the first interaction triggering material. Refer to interface 503.
(3) after detecting an interaction operation input by the user for the first interaction triggering material, displaying the interaction result material corresponding to the first interaction triggering material. Refer to interfaces 505 and 506.
(4) displaying the transition material between the first interaction triggering material and the second interaction triggering material.
(5) displaying the second interaction triggering material. Refer to Interface 508.
(6) after detecting an interaction operation input by the user for the second interaction triggering material, displaying the interaction result material corresponding to the second interaction triggering material. Refer to Interfaces 509 and 510.
(7) displaying the transition material between the second interaction triggering material and the third interaction triggering material.
(8) displaying the third interaction triggering material. Refer to interface 511.
(9) after detecting an interaction operation input by the user for the third interaction triggering material, displaying the interaction result material corresponding to the third interaction triggering material. Refer to interfaces 512 and 513.

In some possible implementations, during the process of the terminal device displaying the interaction process of the interactive content in the feed flow interface, a first download control may further be displayed in the feed flow interface. The first download control is used to trigger the download of the interactive content. For example, when detecting that a current display duration of the interaction process is greater than or equal to a predetermined duration, the first download control is displayed overlapped in a predetermined area of a display image of the interaction process. It should be understood that this embodiment does not limit the display area of the first download control.

Figure 7:
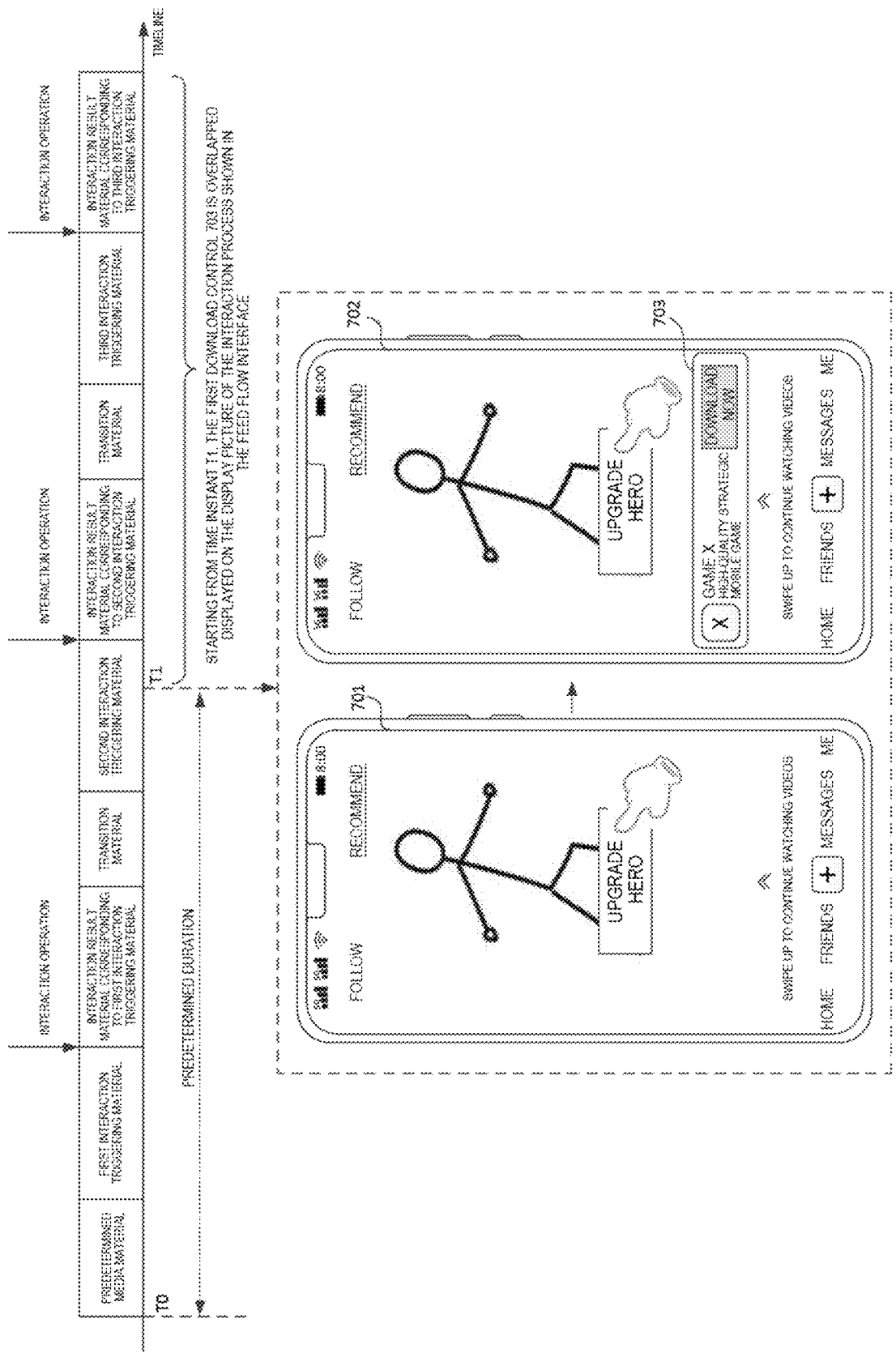
FIG. 7 is a schematic diagram of a display timing and display mode of a first download control provided by the embodiments of the present disclosure.

As an example, FIG. 7 is a schematic diagram of a display timing and display mode of the first download control provided by the embodiments of the present disclosure. As shown in FIG. 7, it is assumed that at time instant T0, the terminal device starts displaying the predetermined media material in the feed flow interface. Then, the terminal device follows the display sequence of the interactive materials as shown in FIG. 6 to present the interaction process of Game X in the feed flow interface.

Assuming that at time instant T1, the terminal device detects that the current display duration (T1-T0) of the interaction process equals to the predetermined duration, and at time instant T1, the display picture of the interaction process displayed in the feed flow interface is as shown in the interface 701. The terminal device overlapped displays the first download control 703 in the predetermined area of the display picture of the interface 701, and the overlapped display picture is as shown in the interface 702.

It should be understood that from time instant T1, the first download control 703 is overlapped displayed on the display picture of the interaction process displayed in the feed flow interface. The user may click on the first download control 703. In response to detecting the click operation input by the user for the first download control 703, the terminal device acquires a download path of the interactive content, and downloads the interactive content according to the download path.

As such, by overlapping displaying the first download control on the display picture of the interaction process of the interactive content, the user can click the first download control at any time during the process of trying to play the interactive content in the feed flow interface to realize the download of the interactive content, so as to improve the convenience of the user's download operation.

In some possible implementations, after the display of the M-th interaction triggering material and the interaction result material corresponding to the M-th interaction triggering material is completed, the following S407 may further be performed.

S407: displaying a mask layer in the feed flow interface, the mask layer comprising one or more of the following: detail information of the interactive content, a second download control for triggering the download of the interaction content; and a re-interaction control for triggering a re-display of the interaction process.

The mask layer can be understood as a kind of layer with transparency less than or equal to a predetermined threshold. When the transparency of the mask layer is low, the content of a picture behind the mask layer can be vaguely seen through the mask layer.

Figure 8:
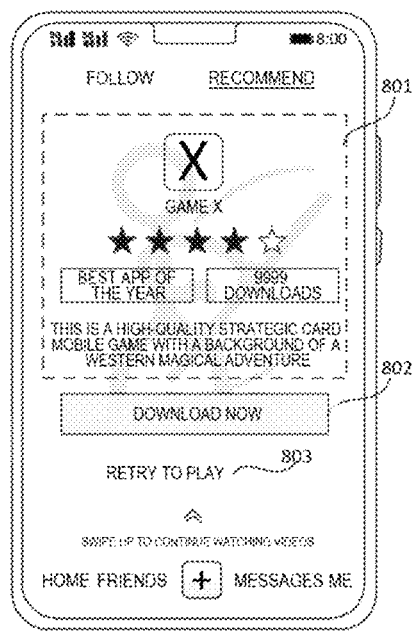
FIG. 8 is a schematic diagram of yet another feed flow display interface provided by the embodiments of the present disclosure.

As an example, FIG. 8 is a schematic diagram of yet another feed flow display interface provided by the embodiments of the present disclosure. When the display of the interaction process of the interactive content ends, the last frame of picture of the interaction process is presented in the feed flow interface, and a mask layer may be overlapped displayed on this picture. The effect of the overlapped display may be referred to in FIG. 8.

Continuing to refer to FIG. 8, detailed information 801 of the interactive content may be displayed in the mask layer, such as, the name of the interactive content (e.g., Program X), the historical number of people who have downloaded the interactive content (e.g., 9999 downloads), the historical comment information of the interactive content (e.g., Best App of the year), feature information of the interactive content (e.g., a high-quality strategic card mobile game with a background of a Western magical adventure), and so on. By means of the above-described detailed information 801, the user's understanding of the interactive content can be further deepened, and the user's willingness to download the interactive content can be strengthened.

Continuing to refer to FIG. 8, a second download control 802 for triggering the download of the interactive content may further be displayed in the mask layer. The user may click the second download control 802. In response to detecting a click operation input by the user for the second download control 802, the terminal device acquires the download path of the interactive content and downloads the interactive content according to the download path.

Continuing to refer to FIG. 8, a re-interaction control 803 for triggering the re-display of the interaction process may further be displayed in the mask layer. Thus, if the user wants to retry to play the interactive content, he or she can click the re-interaction control 803. In response to detecting a click operation input by the user for the re-interaction control 803, the terminal device re-displays the interaction process of the interactive content in the feed flow interface. By providing a retry function, the user can fully experience the interaction process of using the interactive content, which deepens the user's understanding of the interactive content and enhances the user's willingness to download the interactive content.

In the embodiments of the present disclosure, during the process of browsing the feed flow by the user, for the feed flow elements of the interactive type, the interaction triggering materials of the interactive content are directly displayed in the feed flow interface. This allows the user to perform interaction operations on the interaction triggering materials in the feed flow interface, so that the user can feel that he or she is interacting within the feed flow, thereby improving the user's sense of interactivity and participation in the feed flow, and in turn improving the recommendation effect of the interactive content.

Figure 9:
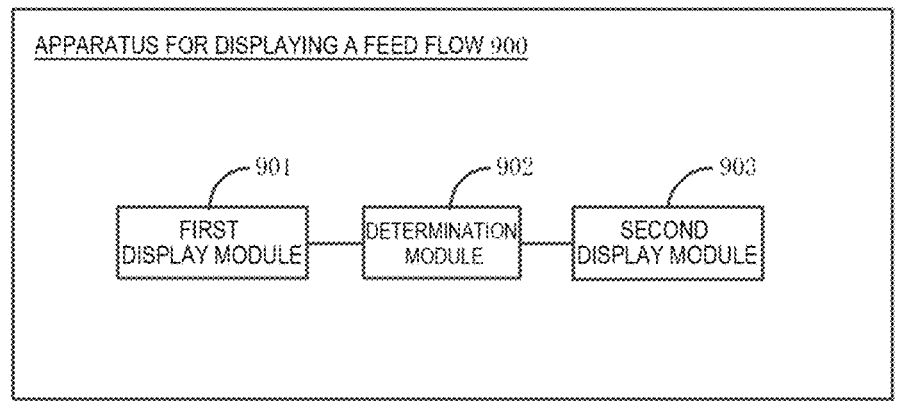
FIG. 9 is a structural diagram of an apparatus for displaying a feed flow provided by the embodiments of the present disclosure.

FIG. 9 is a structural diagram of an apparatus for displaying a feed flow provided by the embodiments of the present disclosure. The apparatus may be in the form of software and/or hardware. As shown in FIG. 9, the apparatus 900 for displaying the feed flow provided by the embodiments comprises: a first display module 901, a determination module 902, and a second display module 903, wherein the first display module 901 configured to present a feed flow interface;

the determination module 902 is configured to in response to detecting a predetermined swipe operation input by a user in the feed flow interface, determine a target feed flow element to be displayed from a plurality of feed flow elements comprised in the feed flow;

the second display module 903 is configured to in response to a type of the target feed flow element being an interactive type, display an interaction process of an interactive content recommended by the target feed flow element in the feed flow interface;

The interaction process is formed based on an interactive material of the interactive content and an interaction operation input by the user for the interactive material, the interaction process indicating an interaction process of using the interactive content.

In one possible implementation, the interactive material includes: the interactive material comprises M interaction triggering materials and interaction result materials corresponding to the respective interaction triggering materials, and M is an integer greater than or equal to 1; the second display module 903 is specifically configured to:

display the i-th interaction triggering material of the interactive content in the feed flow interface;

in response to detecting an interaction operation input by the user for the i-th interaction triggering material, display an interaction result material corresponding to the i-th interaction triggering material in the feed flow interface;

wherein i is equal to 1, 2, . . . , M in turn.

In one possible implementation, the i-th interaction triggering material comprises at least one interactive hot zone; the second display module 903 is specifically configured to:

display the i-th interaction triggering material in the feed flow interface, and displaying a guidance identifier in each interactive hot zone of the i-th interaction triggering material, the guidance identifier being used for guiding the user to input an interaction operation in the interactive hot zone;

in response to detecting an interaction operation input by the user for a target interactive hot zone in the i-th interaction triggering material, display an interaction result material corresponding to the target interactive hot zone of the i-th interaction triggering material in the feed flow interface, the target interactive hot zone is one of the at least one interactive hot zone.

In one possible implementation, i is less than M; the second display module 903 is further configured to:

display a transition material between the interaction result material corresponding to the i-th interaction triggering material and the (i+1)-th interaction triggering material in the feed flow interface.

In one possible implementation, the second display module 903 is further configured to:

in response to detecting that a current display duration of the interaction process is greater than or equal to a predetermined duration, overlap displaying a first download control for triggering a download of the interactive content in a predetermined area of a display image of the interaction process.

In one possible implementation, the device further includes: a control module, where the control module is configured to:

in response to detecting a click operation input by the user on the first download control, acquire a download path of the interactive content, and download the interactive content according to the download path.

In one possible implementation, the second display module 903 is further configured to:

in response to detecting that a completion of the display of the interaction process, display a mask layer in the feed flow interface, the mask layer comprising one or more of the following:

detail information of the interactive content;

a second download control for triggering the download of the interaction content;

a re-interaction control for triggering a re-display of the interaction process.

In one possible implementation, the overlay includes the second download control, and the device further includes: a control module, where the control module is configured to:

in response to detecting a click operation input by the user on the second download control, acquire a download path of the interactive content, and download the interactive content according to the download path.

In one possible implementation, the overlay includes the re-interaction control, and the second display module 903 is further configured to:

in response to detecting a click operation input by the user for the re-interaction control, redisplay the interaction process of the interactive content in the feed flow interface.

According to one or more embodiments of the present disclosure, the second display module 903 is further configured to:

display a predetermined media material corresponding to the interactive type in the feed flow interface, the predetermined media material is used for prompting the user that the interaction process of the interactive content is about to display.

According to one or more embodiments of the present disclosure, the second display module 903 is further configured to:

displaying a predetermined media material corresponding to the interactive type in the feed flow interface, the predetermined media material being used for prompting the user that the interaction process of the interactive content is about to display.

According to one or more embodiments of the present disclosure, the feed flow interface includes a predetermined interface component; the display picture of the interaction process is displayed in full screen in the feed flow interface, and the predetermined interface component is presented on the display picture of the interaction process;

the display location of the predetermined interface component when the first feed flow element is displayed in the feed flow interface is the same as the display location of the predetermined interface component when the interaction process is displayed in the feed flow interface; a type of the first feed flow element is different from a type of the target feed flow element.

According to one or more embodiments of the present disclosure, the interactive content is an application program or a web program.

The apparatus for displaying a feed flow provided by the embodiments may be used to perform the method for displaying the feed flow provided by any of the above method embodiments, and the implementation principles and technical effects thereof are similar, and will not be repeated herein.

To implement the above embodiments, the embodiments of the present disclosure also provide an electronic device.

Figure 10:
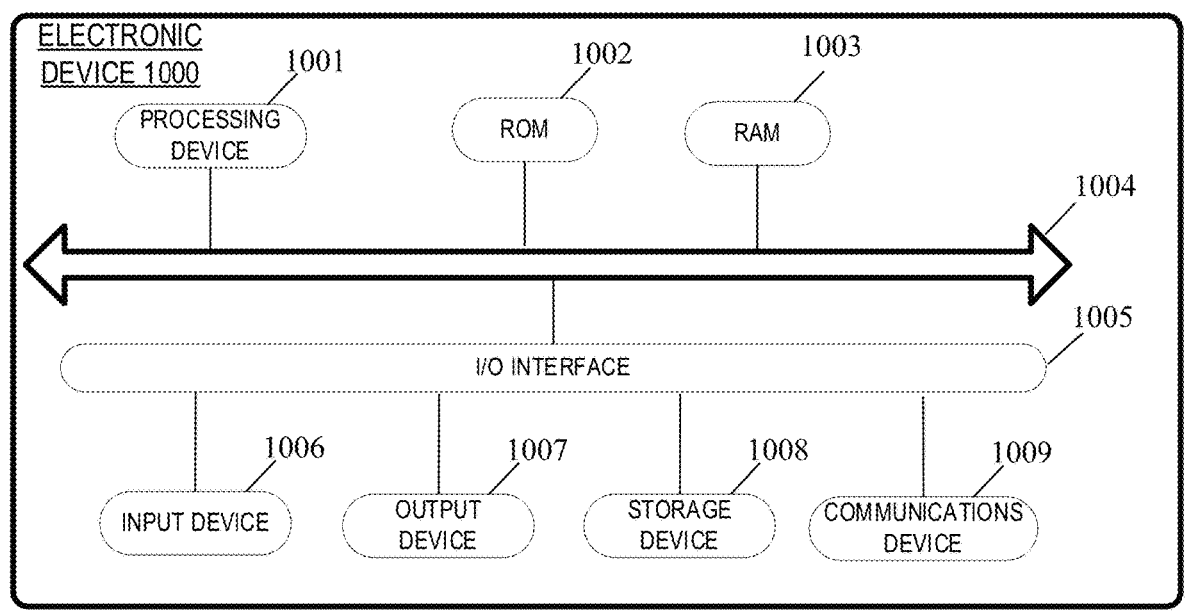
FIG. 10 is a structural diagram of an electronic device provided by the embodiments of the present disclosure.

Referring to FIG. 10, which illustrates a structural diagram of an electronic device 1000 suitable for implementing embodiments of the present disclosure. The electronic device 1000 may be a terminal device or a server. The terminal device may include, but is not limited to, mobile terminals such as mobile phones, laptops, digital broadcast receivers, personal digital assistants (PDA), portable android device (PAD), portable media players (PMP), in-car terminals (e.g., in-car navigation terminals) and the like, and fixed terminals such as digital TVs, desktop computers and the like. The electronic device shown in FIG. 10 is merely an example and should not impose any limitation on the functions and scope of use of the embodiments of the present disclosure.

As shown in FIG. 10, the electronic device 1000 may include a processing apparatus (e.g., a central processing unit, a graphics processing unit, etc.) 1001 that may perform various suitable actions and processes in accordance with a program stored in read only memory (ROM) 1002 or a program loaded into random access memory (RAM) 1003 from memory apparatus 1008. In the RAM 1003, various programs and data necessary for the operation of the electronic device 1000 are also stored. The processing apparatus 1001, the ROM 1002, and the RAM 1003 are connected to each other via a bus 1004. An input/output (I/O) interface 1005 is also connected to the bus 1004.

In general, the following apparatus may be connected to the I/O interface 1005: an input apparatus 1006 including, for example, a touch screen, a touch pad, a keyboard, a mouse, a camera, a microphone, an accelerometer, a gyroscope, or the like; an output apparatus 1007 including, for example, a liquid crystal display (LCD), a speaker, a vibrator, or the like; a memory apparatus 1008 including, for example, a magnetic tape, a hard disk, or the like; and a communication apparatus 1009. The communication apparatus 1009 may allow electronic device 1000 to communicate wirelessly or wired with other devices to exchange data. While FIG. 10 illustrates an electronic device 1030 with a variety of component, it should be understood that it is not required that all of the illustrated components be implemented or provided. More or fewer components may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network via communications apparatus 1009, or installed from memory apparatus 1008, or installed from ROM 1002. When the computer program is executed by the processing apparatus 1001, the above-described functions defined in the method of embodiments of the present disclosure are executed.

It should be noted that the computer readable medium in the present disclosure may be a computer readable signal medium or a computer readable storage medium, or any combination thereof. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic signal, optical signal, or any suitable combination thereof. A computer readable signal medium may also be any computer readable medium that is not a computer readable storage medium and that can transmit, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The above-described computer-readable medium may be included in the electronic device; or it may stand alone and not be assembled into such electronic device.

The above-described computer-readable medium carries one or more programs, and the one or more programs, when executed by the electronic device, causes the electronic device to perform the methods shown in the above embodiments.

Computer program code for carrying out operations for aspects of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The units involved in the embodiments of the present disclosure may be implemented in software, or in hardware. The names of the units do not limit the units themselves in some cases; for example, the first obtaining unit may also be described as "a unit for obtaining at least two Internet Protocol addresses."

The functions described herein above may be performed, at least in part, by one or more hardware logic components. For example, without limitation, exemplary types of hardware logic components that can be used include Field-programmable Gate Arrays (FPGAs). Program-specific Integrated Circuits (ASICs), Application-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In a first aspect, according to one or more embodiments of the present disclosure, a method for displaying a feed flow is provided, the method comprising:

presenting a feed flow interface;

in response to detecting a predetermined swipe operation input by a user in the feed flow interface, determining a target feed flow element to be displayed from a plurality of feed flow elements comprised in the feed flow;

in response to a type of the target feed flow element being an interactive type, displaying an interaction process of an interactive content recommended by the target feed flow element in the feed flow interface;

wherein the interaction process is formed based on an interactive material of the interactive content and an interaction operation input by the user for the interactive material, the interaction process indicating an interaction process of using the interactive content.

According to one or more embodiments of the present disclosure, the interactive material comprises M interaction triggering materials and interaction result materials corresponding to the respective interaction triggering materials, and M is an integer greater than or equal to 1;

the displaying an interaction process of an interactive content recommended by the target feed flow element in the feed flow interface comprises:

displaying the i-th interaction triggering material of the interactive content in the feed flow interface;

in response to detecting an interaction operation input by the user for the i-th interaction triggering material, displaying an interaction result material corresponding to the i-th interaction triggering material in the feed flow interface;

wherein i is equal to 1, 2, . . . , M in turn.

According to one or more embodiments of the present disclosure, the i-th interaction triggering material comprises at least one interactive hot zone; the displaying the i-th interaction triggering material of the interactive content in the feed flow interface comprises:

displaying the i-th interaction triggering material in the feed flow interface, and displaying a guidance identifier in each interactive hot zone of the i-th interaction triggering material, the guidance identifier being used for guiding the user to input an interaction operation in the interactive hot zone;

in response to detecting an interaction operation input by the user for the i-th interaction triggering material, the displaying an interaction result material corresponding to the i-th interaction triggering material in the feed flow interface comprises:

in response to detecting an interaction operation input by the user for a target interactive hot zone in the i-th interaction triggering material, displaying an interaction result material corresponding to the target interactive hot zone of the i-th interaction triggering material in the feed flow interface, the target interactive hot zone is one of the at least one interactive hot zone.

According to one or more embodiments of the present disclosure, wherein i is less than M; and the method further comprises: after displaying the interaction result material corresponding to the i-th interaction triggering material in the feed flow interface in response to detecting the interaction operation input by the user for the i-th interaction triggering material.

displaying a transition material between the interaction result material corresponding to the i-th interaction triggering material and the (i+1)-th interaction triggering material in the feed flow interface.

According to one or more embodiments of the present disclosure, further comprising:

in response to detecting that a current display duration of the interaction process is greater than or equal to a predetermined duration, overlapping displaying a first download control for triggering a download of the interactive content in a predetermined area of a display image of the interaction process.

According to one or more embodiments of the present disclosure, further comprising:

in response to detecting a click operation input by the user on the first download control, acquiring a download path of the interactive content, and downloading the interactive content according to the download path.

According to one or more embodiments of the present disclosure, further comprising:

in response to detecting that a completion of the display of the interaction process, displaying a mask layer in the feed flow interface, the mask layer comprising one or more of the following:

detail information of the interactive content;

a second download control for triggering the download of the interaction content;

a re-interaction control for triggering a re-display of the interaction process.

According to one or more embodiments of the present disclosure, wherein the mask layer comprises the second download control, and the method further comprises:

in response to detecting a click operation input by the user on the second download control, acquiring a download path of the interactive content, and downloading the interactive content according to the download path.

According to one or more embodiments of the present disclosure, wherein the mask layer comprises the re-interaction control, and the method further comprises:

in response to detecting a click operation input by the user for the re-interaction control, redisplaying the interaction process of the interactive content in the feed flow interface.

According to one or more embodiments of the present disclosure, the method further comprises: before displaying the interaction process of the interactive content recommended by the target feed flow element in the feed flow interface, displaying a predetermined media material corresponding to the interactive type in the feed flow interface, the predetermined media material is used for prompting the user that the interaction process of the interactive content is about to display.

According to one or more embodiments of the present disclosure, the feed flow interface includes a predetermined interface component; the display picture of the interaction process is displayed in full screen in the feed flow interface, and the predetermined interface component is presented on the display picture of the interaction process;

the display location of the predetermined interface component when the first feed flow element is displayed in the feed flow interface is the same as the display location of the predetermined interface component when the interaction process is displayed in the feed flow interface; a type of the first feed flow element is different from a type of the target feed flow element.

According to one or more embodiments of the present disclosure, wherein the interactive content is an application program or a web program.

In a second aspect, according to one or more embodiments of the present disclosure, an apparatus for displaying a feed flow is provided, the apparatus comprising:

a first display module configured to present a feed flow interface;

a determination module configured to in response to detecting a predetermined swipe operation input by a user in the feed flow interface, determine a target feed flow element to be displayed from a plurality of feed flow elements comprised in the feed flow;

a second display module configured to in response to a type of the target feed flow element being an interactive type, display an interaction process of an interactive content recommended by the target feed flow element in the feed flow interface;

wherein the interaction process is formed based on an interactive material of the interactive content and an interaction operation input by the user for the interactive material, the interaction process indicating an interaction process of using the interactive content.

According to one or more embodiments of the present disclosure, the interactive material comprises M interaction triggering materials and interaction result materials corresponding to the respective interaction triggering materials, and M is an integer greater than or equal to 1; the second display module is specifically configured to:

display the i-th interaction triggering material of the interactive content in the feed flow interface;

in response to detecting an interaction operation input by the user for the i-th interaction triggering material, display an interaction result material corresponding to the i-th interaction triggering material in the feed flow interface;

wherein i is equal to 1, 2, . . . , M in turn.

According to one or more embodiments of the present disclosure, the i-th interaction triggering material comprises at least one interactive hot zone; the second display module is specifically configured to:

display the i-th interaction triggering material in the feed flow interface, and displaying a guidance identifier in each interactive hot zone of the i-th interaction triggering material, the guidance identifier being used for guiding the user to input an interaction operation in the interactive hot zone;

in response to detecting an interaction operation input by the user for a target interactive hot zone in the i-th interaction triggering material, display an interaction result material corresponding to the target interactive hot zone of the i-th interaction triggering material in the feed flow interface, the target interactive hot zone is one of the at least one interactive hot zone.

According to one or more embodiments of the present disclosure, i is less than M; the second display module is further configured to:

display a transition material between the interaction result material corresponding to the i-th interaction triggering material and the (i+1)-th interaction triggering material in the feed flow interface.

According to one or more embodiments of the present disclosure, the second display module is further configured to:

in response to detecting that a current display duration of the interaction process is greater than or equal to a predetermined duration, overlap displaying a first download control for triggering a download of the interactive content in a predetermined area of a display image of the interaction process.

According to one or more embodiments of the present disclosure, the device further includes: a control module, where the control module is configured to:

in response to detecting a click operation input by the user on the first download control, acquire a download path of the interactive content, and download the interactive content according to the download path.

According to one or more embodiments of the present disclosure, the second display module is further configured to:

in response to detecting that a completion of the display of the interaction process, display a mask layer in the feed flow interface, the mask layer comprising one or more of the following:

detail information of the interactive content;

a second download control for triggering the download of the interaction content;

a re-interaction control for triggering a re-display of the interaction process.

According to one or more embodiments of the present disclosure, the overlay includes the second download control, and the device further includes: a control module, where the control module is configured to:

in response to detecting a click operation input by the user on the second download control, acquire a download path of the interactive content, and download the interactive content according to the download path.

According to one or more embodiments of the present disclosure, the overlay includes the re-interaction control, and the second display module is further configured to:

in response to detecting a click operation input by the user for the re-interaction control, redisplay the interaction process of the interactive content in the feed flow interface.

According to one or more embodiments of the present disclosure, the second display module is further configured to:

display a predetermined media material corresponding to the interactive type in the feed flow interface, the predetermined media material is used for prompting the user that the interaction process of the interactive content is about to display.

According to one or more embodiments of the present disclosure, the feed flow interface includes a predetermined interface component; the display picture of the interaction process is displayed in full screen in the feed flow interface, and the predetermined interface component is presented on the display picture of the interaction process;

the display location of the predetermined interface component when the first feed flow element is displayed in the feed flow interface is the same as the display location of the predetermined interface component when the interaction process is displayed in the feed flow interface; a type of the first feed flow element is different from a type of the target feed flow element.

According to one or more embodiments of the present disclosure, the interactive content is an application program or a web program.

In a third aspect, according to one or more embodiments of the present disclosure, an electronic device is provided, the electronic device comprising: a processor and a memory;

the memory stores computer executable instructions;

the processor executes the computer executable instructions to carry out the method for displaying a feed flow as described in the first aspect and various possible designs of the first aspect.

In a fourth aspect, according to one or more embodiments of the present disclosure, a computer-readable storage medium is provided, wherein the computer-readable storage medium has computer executable instructions stored thereon, wherein the computer executable instructions, when executed by a processor, carry out the method for displaying a feed flow as described in the first aspect and various possible designs of the first aspect.

In a fifth aspect, according to one or more embodiments of the present disclosure, a computer program product is provided, the computer program product comprising a computer program, wherein the computer program, when executed by a processor, carry out the method for displaying a feed flow as described in the first aspect and various possible designs of the first aspect.

The foregoing description is merely illustrative of the preferred embodiments of the present disclosure and of the technical principles applied thereto. As will be appreciated by those skilled in the art, the disclosure of the present disclosure is not limited to the technical solution formed by the specific combination of the described technical features, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for displaying a feed flow, comprising:
presenting a feed flow interface configured to display the feed flow;
in response to detecting a predetermined swipe operation input by a user in the feed flow interface, determining a target feed flow element to be displayed from a plurality of feed flow elements comprised in the feed flow;
displaying a predetermined media material in the feed flow interface in response to determining that a type of the target feed flow element is an interactive type, wherein the predetermined media material is configured to prompt a user to interact with the target feed flow element; and
displaying an interaction process of the target feed flow element in the feed flow interface after finishing display of the predetermined media material in the feed flow interface, wherein the interaction process is formed based on interactive materials of the target feed flow element and one or more interaction operations performed by the user on the interactive materials in the feed flow interface.

2. The method of claim 1, wherein the interactive material comprises M interaction triggering materials and interaction result materials corresponding to the respective interaction triggering materials, and M is an integer greater than or equal to 1;
the displaying an interaction process of an interactive content recommended by the target feed flow element in the feed flow interface comprises:
displaying the i-th interaction triggering material of the interactive content in the feed flow interface;
in response to detecting an interaction operation input by the user for the i-th interaction triggering material, displaying an interaction result material corresponding to the i-th interaction triggering material in the feed flow interface;
wherein i is equal to 1, 2, . . . , M in turn.

3. The method of claim 2, wherein the i-th interaction triggering material comprises at least one interactive hot zone; the displaying the i-th interaction triggering material of the interactive content in the feed flow interface comprises:
displaying the i-th interaction triggering material in the feed flow interface, and displaying a guidance identifier in each interactive hot zone of the i-th interaction triggering material, the guidance identifier being used for guiding the user to input an interaction operation in the interactive hot zone;
in response to detecting an interaction operation input by the user for the i-th interaction triggering material, the displaying an interaction result material corresponding to the i-th interaction triggering material in the feed flow interface comprises:
in response to detecting an interaction operation input by the user for a target interactive hot zone in the i-th interaction triggering material, displaying an interaction result material corresponding to the target interactive hot zone of the i-th interaction triggering material in the feed flow interface, the target interactive hot zone is one of the at least one interactive hot zone.

4. The method of claim 2, wherein i is less than M; and the method further comprises: after displaying the interaction result material corresponding to the i-th interaction triggering material in the feed flow interface in response to detecting the interaction operation input by the user for the i-th interaction triggering material,
displaying a transition material between the interaction result material corresponding to the i-th interaction triggering material and the (i+1)-th interaction triggering material in the feed flow interface.

5. The method of claim 1, further comprising:
in response to detecting that a current display duration of the interaction process is greater than or equal to a predetermined duration, overlapping displaying a first download control for triggering a download of the interactive content in a predetermined area of a display image of the interaction process.

6. The method of claim 5, further comprising:
in response to detecting a click operation input by the user on the first download control, acquiring a download path of the interactive content, and downloading the interactive content according to the download path.

7. The method of claim 1, further comprising:
in response to detecting that a completion of the display of the interaction process, displaying a mask layer in the feed flow interface, the mask layer comprising one or more of the following:
detail information of the interactive content;

a second download control for triggering the download of the interaction content;

a re-interaction control for triggering a re-display of the interaction process.

8. The method of claim 7, wherein the mask layer comprises the second download control, and the method further comprises:

in response to detecting a click operation input by the user on the second download control, acquiring a download path of the interactive content, and downloading the interactive content according to the download path.

9. The method of claim 7, wherein the mask layer comprises the re-interaction control, and the method further comprises:

in response to detecting a click operation input by the user for the re-interaction control, redisplaying the interaction process of the interactive content in the feed flow interface.

10. The method of claim 1, wherein the method further comprises: before displaying the interaction process of the interactive content recommended by the target feed flow element in the feed flow interface, displaying a predetermined media material corresponding to the interactive type in the feed flow interface, the predetermined media material being used for prompting the user that the interaction process of the interactive content is about to display.

11. The method of claim 1, wherein when the first feed flow element is displayed in the feed flow interface, the feed flow interface comprises: a first type of interface component located at a boundary of the feed flow interface, and a second type of interface component located above a display picture of the feed flow interface, a type of the first feed flow element is different from a type of the target feed flow element;

when the interaction process is displayed in the feed flow interface, the first type of interface component is presented at the boundary of the feed flow interface, and the second type of interface component is not presented on the display picture of the feed flow interface, so that the interaction process is displayed in full screen in the feed flow interface.

12. The method of claim 1, wherein the interactive content is an application program or a web program.

13. An electronic device, comprising: a processor and a memory;

wherein the memory stores computer executable instructions;

the processor executes the computer executable instructions to carry out a method comprising:

presenting a feed flow interface configured to display a feed flow;

in response to detecting a predetermined swipe operation input by a user in the feed flow interface, determining a target feed flow element to be displayed from a plurality of feed flow elements comprised in the feed flow;

displaying a predetermined media material in the feed flow interface in response to determining that a type of the target feed flow element is an interactive type, wherein the predetermined media material is configured to prompt a user to interact with the target feed flow element; and displaying an interaction process of the target feed flow element in the feed flow interface after finishing display of the predetermined media material in the feed flow interface, wherein the interaction process is formed based on interactive materials of the target feed flow element and one or more interaction operations performed by the user on the interactive materials in the feed flow interface.

14. The electronic device of claim 13, wherein the interactive material comprises M interaction triggering materials and interaction result materials corresponding to the respective interaction triggering materials, and M is an integer greater than or equal to 1;

the displaying an interaction process of an interactive content recommended by the target feed flow element in the feed flow interface comprises:

displaying the i-th interaction triggering material of the interactive content in the feed flow interface;

in response to detecting an interaction operation input by the user for the i-th interaction triggering material, displaying an interaction result material corresponding to the i-th interaction triggering material in the feed flow interface;

wherein i is equal to 1, 2, ..., M in turn.

15. The electronic device of claim 14, wherein the i-th interaction triggering material comprises at least one interactive hot zone; the displaying the i-th interaction triggering material of the interactive content in the feed flow interface comprises:

displaying the i-th interaction triggering material in the feed flow interface, and displaying a guidance identifier in each interactive hot zone of the i-th interaction triggering material, the guidance identifier being used for guiding the user to input an interaction operation in the interactive hot zone;

in response to detecting an interaction operation input by the user for the i-th interaction triggering material, the displaying an interaction result material corresponding to the i-th interaction triggering material in the feed flow interface comprises:

in response to detecting an interaction operation input by the user for a target interactive hot zone in the i-th interaction triggering material, displaying an interaction result material corresponding to the target interactive hot zone of the i-th interaction triggering material in the feed flow interface, the target interactive hot zone is one of the at least one interactive hot zone.

16. The electronic device of claim 14, wherein i is less than M; and the method further comprises: after displaying the interaction result material corresponding to the i-th interaction triggering material in the feed flow interface in response to detecting the interaction operation input by the user for the i-th interaction triggering material, displaying a transition material between the interaction result material corresponding to the i-th interaction triggering material and the (i+1)-th interaction triggering material in the feed flow interface.

17. The electronic device of claim 13, wherein the processor executes the computer executable instructions to carry out the method further comprising:

in response to detecting that a current display duration of the interaction process is greater than or equal to a predetermined duration, overlapping displaying a first download control for triggering a download of the interactive content in a predetermined area of a display image of the interaction process.

18. The electronic device of claim 17, wherein the processor executes the computer executable instructions to carry out the method further comprising:

in response to detecting a click operation input by the user on the first download control, acquiring a download path of the interactive content, and downloading the interactive content according to the download path.

19. The electronic device of claim 13, wherein the processor executes the computer executable instructions to carry out the method further comprising:

in response to detecting that a completion of the display of the interaction process, displaying a mask layer in the feed flow interface, the mask layer comprising one or more of the following:

detail information of the interactive content;

a second download control for triggering the download of the interaction content;

a re-interaction control for triggering a re-display of the interaction process.

20. A non-transitory computer readable storage medium having computer executable instructions stored thereon, wherein the computer executable instructions, when executed by a processor, carry out a method comprising:

presenting a feed flow interface configured to display a feed flow;

in response to detecting a predetermined swipe operation input by a user in the feed flow interface, determining a target feed flow element to be displayed from a plurality of feed flow elements comprised in the feed flow;

displaying a predetermined media material in the feed flow interface in response to determining that a type of the target feed flow element is an interactive type, wherein the predetermined media material is configured to prompt a user to interact with the target feed flow element; and displaying an interaction process of the target feed flow element in the feed flow interface after finishing display of the predetermined media material in the feed flow interface, wherein the interaction process is formed based on interactive materials of the target feed flow element and one or more interaction operations performed by the user on the interactive materials in the feed flow interface.

* * * * *